UNITED STATES PATENT OFFICE.

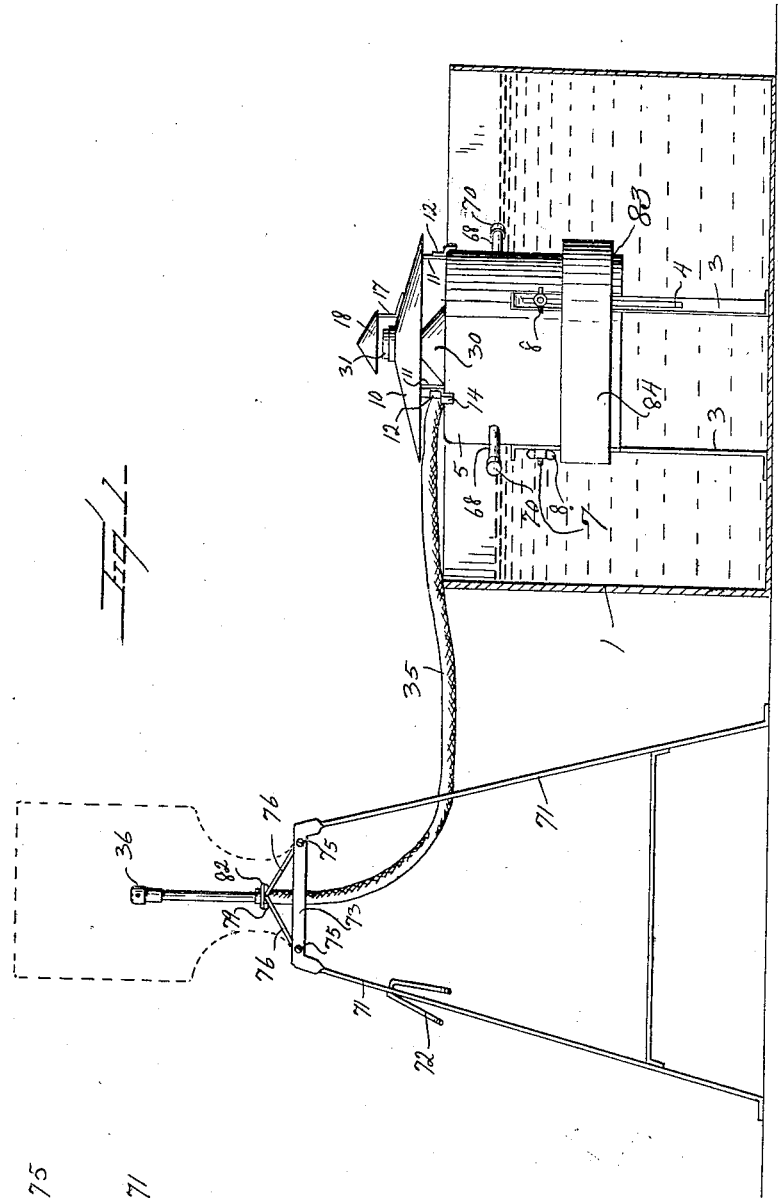

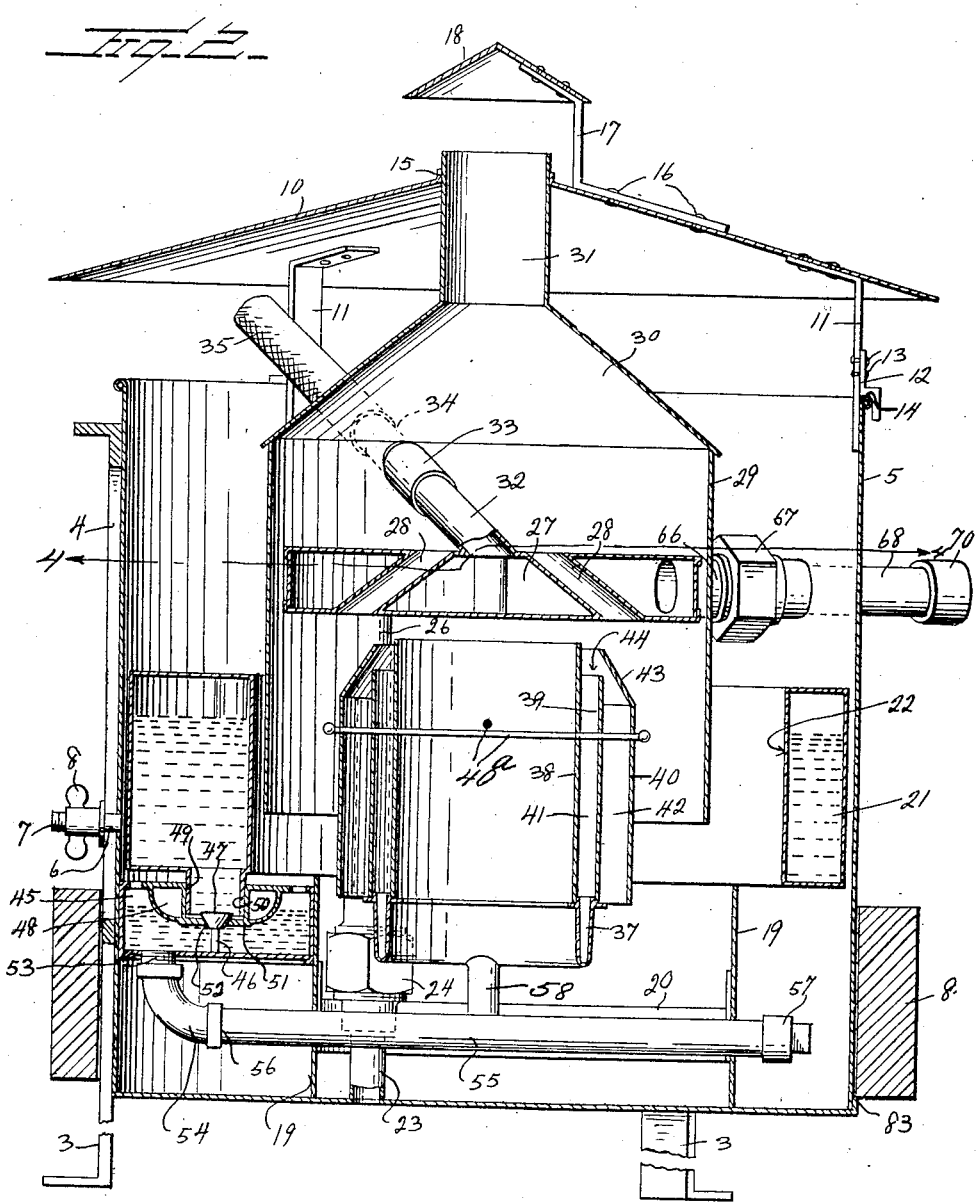

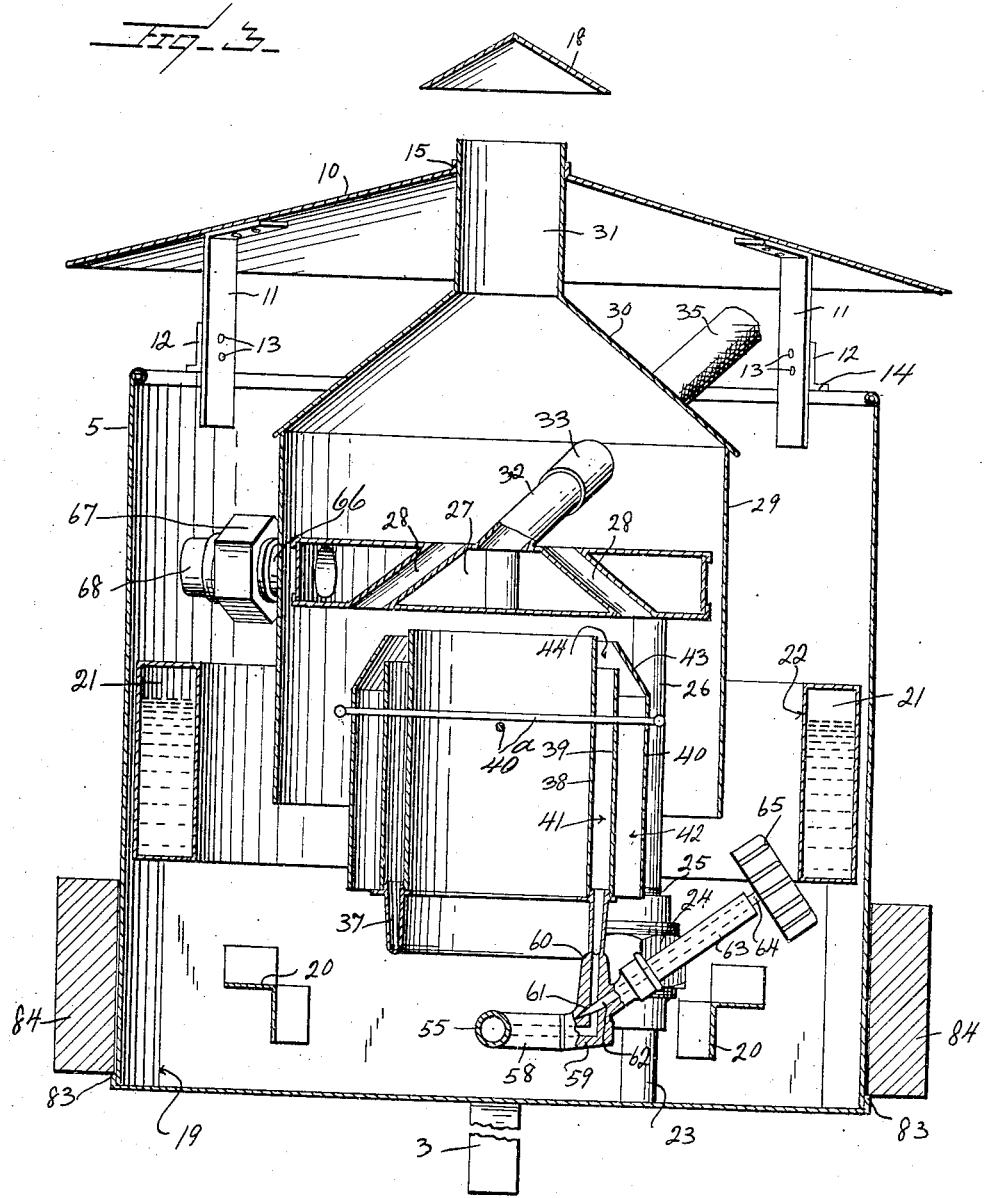

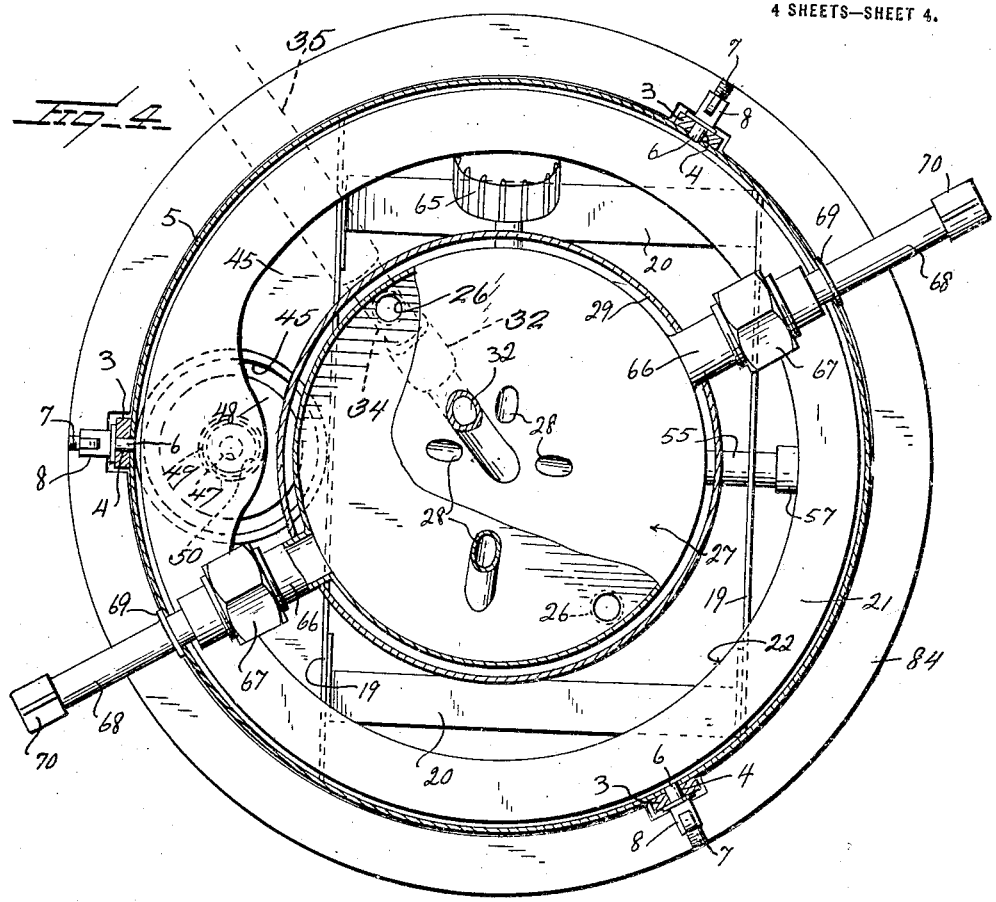
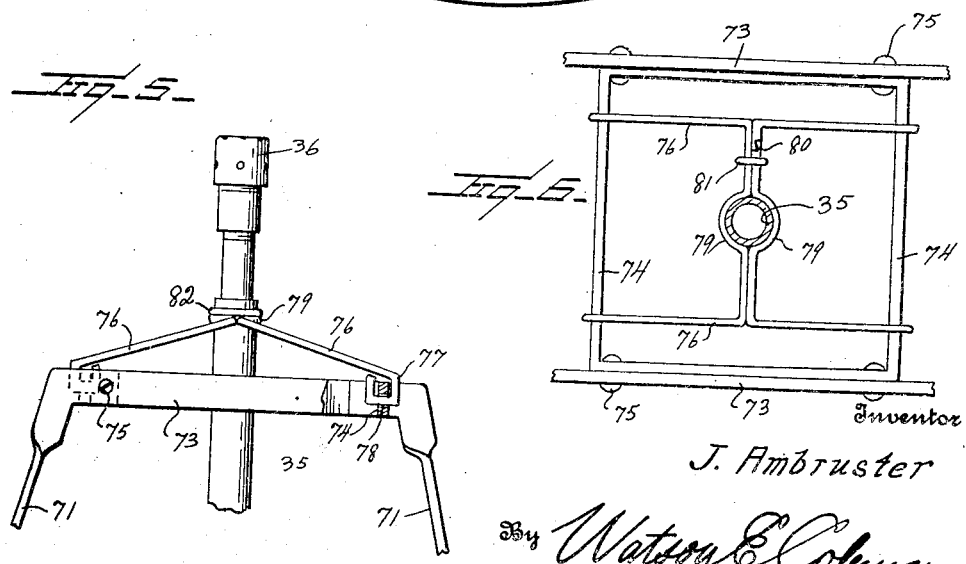

JOSEPH AMBRUSTER, OF FREEPORT, ILLINOIS.

STERILIZER.

1,354,792.

Specification of Letters Patent.

Patented Oct. 5, 1920.

Application filed November 12, 1919. Serial No. 337,453.

*To all whom it may concern:*

Be it known that I, JOSEPH AMBRUSTER, a citizen of the United States, residing at Freeport, in the county of Stephenson and State of Illinois, have invented certain new and useful Improvements in Sterilizers, of which the following is a specification, reference being had to the accompanying drawings.

This invention relates to an improved sterilizer and an object of the invention is to provide a device of this kind particularly adapted for sterilizing milk cans and milk can tops, though not necessarily, for it is obvious that the apparatus may be used for sterilizing any other articles, such as dishes, buckets and the like.

Another object of the invention is to provide a sterilizer including a buoyant water heater.

A further object of the invention is to provide a sterilizer having a buoyant water heater and means for immersing the heater, whereby a constant water level may be maintained in the heater, so that steam may be generated, and means to carry off the steam, for sterilizing various articles, such as milk cans, milk can tops, buckets, dishes and other like articles.

A further object of the invention is to provide a sterilizer including a buoyant water heater mounted upon guides in a water tank, and gravity means removably mounted upon the heater for immersing the heater into the water of the tank and maintaining it at a constant immersed position in the water, whereby the water in the tank may be forced upwardly in the heater, and a constant level thereof maintained in order to generate steam.

While the design and construction at present illustrated and set forth are deemed preferable, it is obvious that as a result of a reduction of the invention to a more practical form for commercial purposes, the invention may be susceptible to changes, and the right to these changes is claimed provided they are comprehended within the scope of what is claimed.

The invention comprises further features and combination of parts, as will be hereinafter set forth, shown in the drawings and claimed.

In the drawings:—

Figure 1 is a vertical sectional view of a water tank, and the improved buoyant water heater mounted therein on guides, illustrated in elevation, and showing a stand and supporting means for a flexible steam hose, particularly adapted for sterilizing milk cans and the tops thereof.

Fig. 2 is a vertical sectional view of the improved sterilizer showing the same on an enlarged scale.

Fig. 3 is a vertical sectional view of the sterilizer taken at right angles to that shown in Fig. 2.

Fig. 4 is a horizontal sectional view on line 4—4 of Fig. 2 to more clearly show the construction of the apparatus.

Fig. 5 is an enlarged view in elevation of the supporting bracket for the flexible steam hose.

Fig. 6 is a plan view of the same.

Fig. 7 is an enlarged detail view of one of the sides of the frame 71, showing the hooks 72 in side elevation.

Referring more especially to the drawings 1 designates a water tank, which may be any conventional shape or configuration and of any proportions. Arranged in the tank and adapted to engage or not to engage with the bottom thereof are vertical guides 3 provided with elongated slots 4. There are three of these guides in number, though not necessarily, for the reason that the number of guides may be varied.

A housing or casing 5 is mounted between the guides, and is adapted to contain the sterilizing apparatus. Carried by the casing 5 and forming integral parts thereof are bosses 6 provided with screw studs 7, to be engaged by the winged nuts 8. The screw studs 7 pass through the elongated slots 4 of the vertical guides 3 so as to guide the casing or housing 5 during the rise and fall of the level of the water in the tank 1. This housing or casing 5 is preferably constructed of galvanized iron, though not necessarily, for it is obvious that other metal may be used.

A hood 10 is provided, and which may be constructed of any suitable metal, such as galvanized sheet iron. This hood 10 is provided with downwardly extending arms 11 to which angle plates 12 are secured in any suitable manner such as indicated at 13. The depending arms of the angle plates 12 and the arms 11 straddle the upper marginal portion of the housing or casing 5, whereby the shoulders 14 of the angle plates may engage upon the marginal edge of the casing or housing 5, thereby supporting the hood 10, in a spaced position relatively to the housing or casing 5. The hood 10 has a flanged concentric opening 15. Secured at 16 on the hood 10 (which is preferably conical) is a bracket 17, which supports an auxiliary hood 18.

Suitable supports 19 rise upwardly from the bottom of the housing or casing 5, and are reinforced by the braces 20. An oil tank 21 is mounted upon the supports 19, concentrically within the casing or housing 5. The oil tank 21 is preferably annular in contour, and its central opening 22 provides sufficient space for the heater proper and its hood or casing.

Rising upwardly from the bottom of the casing or housing 5 are tubular extensions 23 to which are threaded unions 24. In turn, threaded to the unions as at 25, are upwardly extending supporting pipes or tubes 26, the upper ends of which integrally support the water heater 27 proper. This water heater 27 proper is preferably of a flat contour and also cylindrical in form, though not necessarily, and is designed to receive its water supply through the tubes 23, the unions 24 and the tubular supports or pipes 26. Suitable openings 28 are formed through the water heater 27 proper, in order to permit the escape of the products of combustion from the burner which is disposed below. A suitable hood or housing 29 provided with a conical top 30 incloses or fits down over the water heater proper, and is concentric therewith in order to confine the heat from the burner around the water heater. The conical top 30 of the housing or hood 29 terminates in a cylindrical extension 31 which passes upwardly through the flanged opening 15 and secured therein in any suitable manner in order to carry off the products of combustion from the burner. The hood or cover 18 is disposed immediately above the extension 31 acting as a baffle for the escaping products of combustion from the burner. A steam outlet pipe 32 is connected to the water heater proper 27 and by means of a union 33 and a short pipe coupling 34, it is connected to a flexible hose 35. This hose 35 terminates in a suitable nozzle 36 adapted for spraying the various articles to be sterilized by the steam.

A burner 37 is mounted in spaced position below the hot water heater proper 27, and is designed to burn any suitable fuel, preferably crude oil or the like, which is contained in the tank 21. Rising upwardly from the burner is a plurality of concentrically arranged cylindrical casings 38, 39 and 40, which are of different diameter, one within the other, thereby providing annular passages or flues 41 and 42. It will be noted that the central casing 39 is shorter than the casings 38 and 40 and furthermore the heat from the burner passes upwardly through the annular flue 41, while air is drawn upwardly through the flue 42. The drawing of air upwardly through the flue 42 is due to the fact that the outer cylindrical casing 40 is longer than the central cylindrical casing 39, and has a converging or conical flange 43 at its upper portion over-lying the central cylindrical casing 39, so that as the heat leaves the flue or passage 41 at a point as indicated at 44, air is drawn through the passage or flue 42. Also by means of the converging or conical flange 43 the heat is directed and confined to the greater central portion of the center of the hot water heater proper 27. By this construction the water in the heater 27 is instantly heated, thereby generating steam which can be carried off through the pipe and hose 32 and 35. Crossing headed rods 40ª are carried by the casings 38 and 39. These rods also pass through the casing 40 to support the same. Said rods are arranged at right angles to each other.

One of the supports 19 assists in supporting an oil reservoir 45 which has a communicating connection with the oil tank 21. Rising upwardly from the bottom of the oil reservoir is a stationary valve stem 46 terminating at its upper end in a conical valve 47. Mounted in the reservoir is a float 48, which has a central opening 49, adapted to receive the extension 50, which depends downwardly from the oil tank. By this construction the float is guided in its rise and fall according to the level of the oil in the reservoir. The central opening 49 of the float has a circular wall 51 provided with a valve seat 52 to coöperate with the valve 47. It will be noted that as the level of the oil lowers in the reservoir, the float will correspondingly lower, thereby causing the valve seat 52 to disengage from the valve 47, hence permitting oil to enter the reservoir, in order to renew its supply. The bottom of the reservoir has a threaded extension 53 to which an elbow 54 is connected by means of threads. A pipe 55 is connected at 56 to the elbow, and its other end is provided with a cap 57, which is threaded in place. The pipe 55 substantially midway its ends has a lateral extension 58 to which a valve casing 59 is connected in any suitable manner. This casing 59 is connected as indicated at 60 to the lower marginal portion of the burner. The valve casing 59 has a needle valve seat 61, with which a needle valve 62 coöperates, for controlling the oil into the burner. An extension tubular casing 63 is connected to the valve casing, and carries the needle valve stem 64, which is provided with a hand wheel 65. The needle valve stem is threaded in the tubular casing 63, and by rotating the hand wheel 65 in one direction or the other, the needle valve may be opened and closed, for controlling oil into the burner.

The hot water heater 27 is provided with diametrically opposite extensions 66, to which unions 67 are connected. Pipe extensions 68 are connected to the unions 67, and pass outwardly through the wall of the housing or casing 5, there being suitable packing glands 69, to insure a tight joint where the pipes 68 pass through the wall of the housing or casing 5. The outer ends of the pipes 68 have caps 70 and by removing these caps, allowing a certain amount of the hot water from the water heater to pass outwardly into the water tank 1, the water therein is kept from freezing. However, when the sterilizing apparatus is in operation, the caps 70 are applied.

A suitable skeleton stand 71 is arranged in close position to the tank 1, and is provided with one or more hooks 72, on which milk can tops or lids may be suspended for sterilization. This stand comprises the upright U-shaped pieces 73, the upper parts of which are connected by the transverse bars 74, the lateral ears of which are secured by screws or the like 75 to the upper parts of the U-shaped pieces 73. Clamping bails 76 for the flexible hose 35 are provided. These clamping bails are U-shaped, and the ends of their arms terminate in hooks 77, which engage apertures or openings 78 in the transverse bars 74. The U-shaped clamping bails are disposed so as to converge toward each other, as shown clearly in the drawings, and their adjacent transverse parts (which contact) are provided with semi-circular hose clamping portions 79. The transverse portions of one of the clamping bails is severed and the severed ends over-lap as indicated at 80, one acting to hold the other in place. A loop 81 engages about the transverse part of the U-shaped clamping bail so as to hold the semi-circular clamping portions 79 in clamping engagement with the flexible hose. A shoulder 82 is formed upon the nozzle of the flexible hose, and the semi-circular clamping portions 79 of the transverse parts of the clamping bails are designed to engage under the shoulder 82, to support the nozzle substantially in a perpendicular position.

It is to be noted that the flexible steam hose may be manipulated so that its nozzle may be disposed in any desired position, so as to direct a steam spray in any direction for the purpose of sterilizing milk cans and milk can tops, or any other article. However, the apparatus is designed especially for sterilizing milk cans and their tops.

The tops are designed to be suspended upon the hooks 72, while the can is designed to be inverted and supported upon the U-shaped clamping bail, so that the nozzle may extend upwardly into the can as shown clearly in Fig. 1, the can having been inverted.

Adjacent the lower marginal corner of the housing or casing 5, an annular shoulder 83 is formed. A counter-balancing weight 84 (which is in the form of a ring or annulus) is fitted telescopically on the casing or housing 5 so as to engage the annular shoulder 83. The weight 84 is just heavy enough to float the heater in an immersed position in the water of the tank 1, as shown in Fig. 1. However, before permitting the sterilizer to lower to an immersed position in the water, the needle valve 62 is adjusted, to permit the necessary quantity of oil to reach the burner. The burner is then lighted, and then by loosening the winged nuts 8 (which act to support the sterilizer in a raised position while the parts are being adjusted) so as to permit the sterilizer to immerse under the action of the weight 84. The water in the tank 1 then passes upwardly into the tubular extensions or pipes 23 through the unions 24 and the pipes or tubes 26 to the hot water heater 27. The heat from the burner then heats the water in the heater, generating steam, which is carried off through the flexible steam hose, and allowed to escape from the spray nozzle 36, so as to sterilize the milk can. As the water in the tank 1 is consumed, or rather when the level of the water lowers, the sterilizer will automatically lower, since it is the aim that the weight and the sterilizer parts are so constructed and counter-balanced relatively to each other, whereby the sterilizer is maintained in a partially immersed position in the water, such as shown in Fig. 1. After the water in the tank 1 has been consumed sufficiently to prevent any generation of steam in the heater, the tank may be replenished.

It is obvious that before permitting the sterilizer to lower to an immersed position in the water of the tank 1, the needle valve 62 should be adjusted to permit the requisite quantity of oil to enter the burner, so that to render it unnecessary to adjust the valve after the sterilizer has been immersed.

Furthermore, the oil tank is designed to be filled before the sterilizer or heater is allowed to lower or immerse in the water of the tank. Furthermore, this improved heater is designed to be used for sterilizing the water in the tank 1. This may be accomplished primarily by removing the caps 70 from the ends of the pipes or tubes 68, and since the level of the water remains constantly at half the diameter of said pipes there will be a thorough circulation of water from the tank 1, through the heater and said pipes. When the apparatus is not being used for sterilizing milk cans, it is the aim to remove these caps 70, permitting the apparatus to be used for sterilizing the water in the tank 1 and at the same time keeping the same from freezing.

However, when sterilizing milk cans, the caps 70 are applied so as to prevent the water from entering the pipes or tubes 68 at the level of the water. As previously stated, the weight is sufficient to maintain the sterilizing apparatus or heater at a constant immersed position with the level of the water substantially at half the diameter of the tubes or pipes 68. In this case, the water rises upwardly in the pipes or tubular sections 23 and 26 and into the water heater proper, wherein there is a generation of sufficient steam, to be carried off through the flexible delivery hose 35, and discharged at the steam spray nozzle.

However, should it be found advisable, the guides 3 may be connected to the bottom of the tank 1 and should this occasion arise, the sterilizer may be set in an immersed position on the guides 3 with the level of the water a short distance, possibly an inch or more above the pipes or tubes 68, though not necessarily, so that when the caps 70 are removed, the water in the tank 1 may be more thoroughly sterilized, owing to the water having a better circulation from the tank 1 through the apparatus and through the pipes 68 when they are below the level of the water.

The invention having been set forth, what is claimed as new and useful is:

1. In a sterilizer apparatus, the combination with a water tank having guides rising upwardly from its bottom, a buoyant water heater mounted upon the guides and including a steam hose connected to the heater, and means on the heater for maintaining the heater in a constant immersed position in the water, for maintaining a constant level of water in the heater in accordance with the rise and fall of the level of the water in the tank.

2. In an apparatus as set forth, the combination with a water tank including guides therein, of a sterilizing apparatus movably mounted upon the guides and including a heater upwardly into which the water in the tank is adapted to enter for the generation of steam, and means on the sterilizing device automatically movable correspondingly to the level of water in the tank for maintaining the sterilizing apparatus immersed, whereby a constant level of water is maintained in the heater.

3. In a sterilizing apparatus, the combination with a water tank including guides therein, of a sterilizing apparatus movable on the guides and including the water heater, and counter-balancing means removably mounted upon the sterilizing apparatus and being automatically movable correspondingly to the level of the water in the tank for maintaining the sterilizing apparatus immersed in a constant immersed position, for maintaining the water at a constant level in the heater, and a steam hose connected to the heater.

4. In an apparatus as set forth, the combination with a water tank including guides therein, of a sterilizing apparatus mounted on the guides and including a water heater adapted to receive water from the tank, and movable means for maintaining the sterilizing apparatus in a constant immersed position in the water of the tank for causing a constant level of water in the heater.

5. In an apparatus as set forth, the combination with a buoyant water heater, of a water tank in which the heater is movably mounted, and movable means detachably mounted upon and in surrounding relation to the heater for maintaining the heater in a constant immersed position in the water of the tank to insure a constant level of water in the heater.

6. In an apparatus as set forth, the combination with a water tank, of a heater immersed therein, means detachably mounted upon and in surrounding relation to the heater for maintaining the heater immersed, said heater including a casing, a water heater proper in the casing and having tubular supports in the bottom of the casing communicatively connecting with the interior of the tank, whereby the water in the tank may rise upwardly into the heater proper and adapted to be held at a constant level in said heater by the means for immersing the casing of the heater, and means for carrying off steam from the heater.

7. In an apparatus as set forth, the combination with a water tank, of a heater casing mounted therein, a heater proper in said casing and having tubular supports rising upwardly from the bottom of the casing communicating the heater proper with the interior of the tank, and means detachably mounted upon and in surrounding relation to the heater casing for maintaining the same in a constant immersed position in the water of the tank, thereby maintaining a constant level of water in the heater, and means for carrying off the steam from the heater for sterilization purposes.

8. In an apparatus as set forth, the combination with a water tank, of a heater casing mounted therein, a water heater in said casing having means of communication with the interior of the tank, whereby water may rise upwardly into the water heater, means detachably mounted upon and in surrounding relation to the casing for immersing the same and maintaining it at a constant immersed position in the water of the tank, whereby the water may rise in the water heater and assume a constant level therein correspondingly to the level of the water in the tank, and means for carrying off the steam from the water heater for sterilization purposes.

9. In an apparatus as set forth, the combination with a water tank, of a heater casing mounted therein, a water heater in said casing having means of communication with the interior of the tank, whereby water may rise upwardly into the water heater, means detachably mounted upon and in surrounding relation to the casing for immersing the same and maintaining it at a constant immersed position in the water of the tank, whereby the water may rise in the water heater and assume a constant level therein correspondingly to the level of the water in the tank, and means for carrying off the steam from the water heater for sterilization purposes, and means carried by the water heater proper and passing through the wall of the casing for preventing freezing of the water in the tank.

10. In an apparatus as set forth, the combination with a water tank, of a heater casing movably guided therein, a water heater proper supported in the casing and having communicative connection with the interior of the tank, whereby the water therein may rise upwardly into the water heater, a heating unit supported in the casing and including flues for confining and directing the heat upon the water heater, and means on the casing for maintaining the same in a constant immersed position in the water of the tank, whereby the water may rise upwardly into the water heater and be maintained at a constant level therein, according to the level of the water in the tank, and means for carrying off steam from the water heater.

11. In an apparatus as set forth, the combination with a water tank, of a heater casing movably guided therein, a water heater proper supported in the casing and having communicative connection with the interior of the tank, whereby the water therein may rise upwardly into the water heater, a heating unit supported in the casing and including flues for confining and directing the heat upon the water heater, and means on the casing for maintaining the same in a constant immersed position in the water of the tank, whereby the water may rise upwardly into the water heater and maintained at a constant level therein, according to the level of the water in the tank, and means for carrying off steam from the water heater, and means carried by the water heater and passing through the casing for preventing the water in the tank from freezing.

12. In an apparatus as set forth, a water tank, guides rising upwardly from the bottom of the tank, a sterilizing apparatus mounted on the guides and including a water heater adapted to receive water from the tank, movable means on the sterilizing apparatus for maintaining the same in a constantly immersed position in the water of the tank, and means carried by the casing of the sterilizing apparatus and coöperating with the guides and constituting means adapted for holding the sterilizing apparatus in different fixed positions relatively to the tank.

13. In an apparatus as set forth, a water tank, slotted guides mounted on the bottom of the tank, a sterilizing apparatus engaging between the guides and including a water heater to receive water from the tank and means carried by the casing of the apparatus and coöperating with the slots of the guides to hold the sterilizing apparatus in different adjusted fixed positions relatively to the tank.

14. In an apparatus as set forth, a water tank having guides therein, a sterilizing apparatus movable on the guides, means on the sterilizing apparatus for maintaining the same immersed, a water heater in the casing of the sterilizing apparatus and having means of communication with the tank through the wall of the casing of the sterilizing apparatus, whereby water from the tank may enter the water heater, a heating unit for the water heater, said heating unit including a plurality of annular walls in surrounding spaced concentric relation for directing the heat from the unit on the bottom of the water heater, and means for carrying off the steam from the water heater for sterilization purposes.

15. In an apparatus as set forth, a sterilization device comprising a casing, a water heater in said casing, a second casing housing the water heater, a heating unit disposed below the water heater for heating the water therein, said heating unit including a plurality of cylindrical walls surrounding each other and in spaced concentric relations for directing and confining the heat from the unit directly on the bottom of the water heater.

In testimony whereof I hereunto affix my signature.

JOSEPH AMBRUSTER.